(12) United States Patent
Berson et al.

(10) Patent No.: US 7,197,706 B1
(45) Date of Patent: Mar. 27, 2007

(54) METHOD AND SYSTEM FOR ENSURING ACCURATE FONT MATCHING IN DOCUMENTS

(75) Inventors: Brian Berson, Mill Valley, CA (US);
Trent Brown, Kentfield, CA (US);
Drew Wilson, San Francisco, CA (US)

(73) Assignee: Celartem Inc., Portland, OR (US)

( * ) Notice: Subject to any disclaimer, the term of this patent is extended or adjusted under 35 U.S.C. 154(b) by 575 days.

(21) Appl. No.: 09/651,428

(22) Filed: Aug. 30, 2000

(51) Int. Cl.
*G06F 15/00* (2006.01)
(52) U.S. Cl. .................................................... 715/542
(58) Field of Classification Search ................ 715/542, 715/526, 530, 500; 345/471, 472; 358/1.11
See application file for complete search history.

(56) References Cited

U.S. PATENT DOCUMENTS

| | | | |
|---|---|---|---|
| 5,291,243 A * | 3/1994 | Heckman et al. ............. 399/3 |
| 5,528,742 A * | 6/1996 | Moore et al. ................ 715/542 |
| 5,533,174 A * | 7/1996 | Flowers et al. ............ 358/1.15 |
| 5,583,978 A | 12/1996 | Collins et al. ............... 345/170 |
| 5,689,724 A * | 11/1997 | Morgan et al. ............. 715/542 |
| 5,754,187 A * | 5/1998 | Ristow et al. .............. 345/469 |
| 5,825,987 A * | 10/1998 | Asada ........................ 358/1.11 |
| 5,990,907 A * | 11/1999 | Colletti ....................... 345/467 |
| 6,065,008 A * | 5/2000 | Simon et al. ................. 707/10 |
| 6,073,147 A * | 6/2000 | Chan et al. ................. 715/542 |
| 6,157,390 A * | 12/2000 | Cheng ......................... 345/467 |
| 6,278,465 B1 * | 8/2001 | Nielsen ....................... 345/472 |
| 6,323,864 B1 | 11/2001 | Kaul et al. .................. 345/467 |
| 6,323,865 B1 * | 11/2001 | Colletti ....................... 345/467 |
| 6,331,895 B1 | 12/2001 | Erickson et al. ........... 358/1.13 |
| 6,338,003 B1 * | 1/2002 | Kamiguchi et al. ......... 700/169 |
| 6,381,028 B1 * | 4/2002 | Gauthier .................... 358/1.11 |
| 6,426,751 B1 * | 7/2002 | Patel et al. ................. 345/468 |
| 6,460,040 B1 * | 10/2002 | Burns .......................... 707/10 |
| 6,480,291 B1 | 11/2002 | Daniels et al. ............. 358/1.11 |
| 6,501,475 B1 * | 12/2002 | Cheng ......................... 345/467 |
| 6,510,426 B1 * | 1/2003 | Cohen et al. ................... 707/4 |
| 6,512,522 B1 * | 1/2003 | Miller et al. ................ 345/474 |
| 6,512,531 B1 * | 1/2003 | Gartland ..................... 345/854 |
| 6,535,214 B1 | 3/2003 | Morikawa et al. .......... 345/467 |
| 6,552,728 B1 | 4/2003 | Moore et al. ............... 345/471 |
| 6,613,099 B1 * | 9/2003 | Crim .......................... 715/523 |
| 6,615,234 B1 * | 9/2003 | Adamske et al. ........... 709/203 |
| 6,618,162 B1 | 9/2003 | Wiklof et al. .............. 358/1.15 |
| 6,661,416 B1 * | 12/2003 | Muikaichi et al. .......... 345/467 |
| 6,665,842 B1 * | 12/2003 | Nielsen ....................... 715/542 |
| 6,675,357 B1 * | 1/2004 | Carter et al. ............... 715/542 |
| 6,675,358 B1 * | 1/2004 | Kido .......................... 715/542 |
| 6,678,410 B1 | 1/2004 | Phinney et al. ............. 382/181 |
| 6,678,688 B1 * | 1/2004 | Unruh ........................ 707/101 |
| 6,687,879 B1 * | 2/2004 | Teshima ..................... 715/542 |
| 6,775,729 B1 * | 8/2004 | Matsuo et al. ............. 710/263 |
| 6,853,980 B1 * | 2/2005 | Ying et al. ................... 705/27 |
| 6,882,344 B1 * | 4/2005 | Hayes et al. ............... 345/467 |

(Continued)

OTHER PUBLICATIONS

Chen et al., Word Spotting in Scanned Images Using Hidden Markov Models, IEEE 1993, pp. V-1 to V-4.*

(Continued)

*Primary Examiner*—Cong-Lac Huynh
(74) *Attorney, Agent, or Firm*—Sawyer Law Group LLP

(57) ABSTRACT

Method and system aspects are described for ensuring accurate font matching in exchanged documents. The aspects include forming a database of font specifications. The aspects further include accessing the database when saving and opening documents to ensure usage of proper fonts.

20 Claims, 3 Drawing Sheets

U.S. PATENT DOCUMENTS

| | | | | |
|---|---|---|---|---|
| 6,901,427 | B1* | 5/2005 | Teshima | 709/203 |
| 6,954,898 | B1* | 10/2005 | Nakai et al. | 715/542 |
| 7,111,238 | B1* | 9/2006 | Kuppusamy et al. | 715/542 |
| 2001/0048437 | A1* | 12/2001 | Sato et al. | 345/471 |
| 2002/0054349 | A1* | 5/2002 | Cohen et al. | 358/1.15 |
| 2002/0174145 | A1* | 11/2002 | Duga et al. | 707/513 |
| 2003/0028561 | A1* | 2/2003 | Gounares et al. | 707/513 |

OTHER PUBLICATIONS

Gruman, Adobe Acrobat 2.0, Macworld San Francisco Mar. 1995, vol. 12, Iss. 3, pp. 59-60.*

Bowman, Adobe Type Manager Deluxe 4.0 for Windows 95 Now Available, PR Newswire, New York, Jul. 16, 1996, p. 1.*

Gruman, Limited Font Support Hobbles WordPerfect Envoy, InfoWorld Oct. 10, 1994, ProQuest, pp. 1-6.*

Rasmus, Mac Passes the Bar (Code, Manufacturing Systems, Jun. 1992, vol. 10, Iss. 6, pp. 54-55.

Dzilna, PDF Steals the Shows, Folio: the Magazine for Magazine Management, Jun. 1998, vol. 27, Iss. 8, p. 47.

Beale, Adobe Unveils a New Acrobat, Macworld, May 1999, vol. 16, Iss. 5, pp. 27-28.

Shalat, Font-Management Software, Macworld, Apr. 2000, vol. 17, Iss. 4, p. 48.

Hussain, On Cumputerisation and Representation of Characters, IEEE Nov. 1995., pp. 11/1-11/9.

* cited by examiner

METHOD AND SYSTEM FOR ENSURING ACCURATE FONT MATCHING IN DOCUMENTS

RELATED APPLICATIONS

The present invention is related to co-pending U.S. Application, entitled METHOD AND SYSTEM FOR IDENTIFYING FONTS IN DOCUMENTS, Ser. No. 09/651,831, filed on Aug. 30, 2000, and assigned to the assignee of the present invention.

FIELD OF THE INVENTION

The present invention relates to storage and use of font identification in documents to ensure accurate font matching.

BACKGROUND OF THE INVENTION

Desktop publishing tools have made document production easier and more widespread. In an ideal workflow for desktop publishing, any document opened on any machine in any application would have the correct fonts activated with the document and have error-free printing. Unfortunately, such an ideal workflow does not exist at present due to problems with font identification within documents.

Using the "wrong" font can cause a document to image incorrectly. Thus, the problems with font identification extend to documents provided in a plethora of environments, including HTML (hyper text markup language) page "documents" and text packet "documents" downloaded to set-top boxes, for example. The wrong font is one whose data (metrics, glyphs, encoding, etc.) differ from the original font such that text won't image in the same manner as with the original font. With most applications in the computing environment today, fonts are referenced using the name of the font. For example, in a QuarkXPress or Adobe Illustrator document, any fonts used within the document are referenced by the document using the font's name as the key, e.g., if a document used Bauhaus Bold as a font, the name Bauhaus Bold will be referenced within the document. Whenever that document is opened by the application, the application will make a request to the Operating System for a font with the referenced name, e.g. Bauhaus Bold.

While the inclusion of the font name does allow for a rudimentary identification of the font used, a problem arises from the fact that the font name is not unique within the font name space. In other words, there may be numerous fonts that go by the same name, e.g., Bauhaus Bold, that, in fact, behave in different ways. While these fonts may actually be fairly close in specification, the differences can be sufficient to cause some drastic problems. For example, if the width tables of the two Bauhaus Bold fonts are different, the horizontal line spacing could be different when the document is imaged with the incorrect Bauhaus Bold font. The end result could be as drastic as paragraphs of text missing their last line. The ramifications of this, and the potential liability, can be, and often is, quite significant.

Embedding the entire font within a document is a possibility that exists in order to avoid problems with incorrect font identification. Unfortunately, fonts are copyrighted and are licensed for use. By embedding the fonts within documents, there is huge potential for copyright infringement and very little protection for the intellectual property that is the font, since the documents may be used in a variety of worksites. Further, font files can be large, and therefore, embedding all the necessary font files within a document can result in very large document files, as well as a lot of redundancy, since many documents share the same fonts.

Accordingly, a need exists for a method and system for uniquely identifying fonts in a meaningful and efficient manner and for avoiding problems that mismatched fonts cause in document exchange. The present invention addresses such a need.

SUMMARY OF THE INVENTION

The present invention provides method and system aspects for uniquely identifying fonts in a document. The unique identification includes calculating a plurality of attributes for a font and saving the plurality of attributes as a font specification.

With the present invention, unique font identification is provided for documents in an efficient manner to successfully avoid problems associated with font mismatching. The use of font specifications in accordance with the present invention is performed without any reliance on a specific operating platform or on copyrighted information of a font. These and other advantages of the aspects of the present invention will be more fully understood in conjunction with the following detailed description and accompanying drawings.

DETAILED DESCRIPTION OF THE INVENTION

The present invention relates to font identification in documents, including Internet HTML pages, and text packets downloaded to set-top boxes. The following description is presented to enable one of ordinary skill in the art to make and use the invention and is provided in the context of a patent application and its requirements. Thus, the present invention is not intended to be limited to the embodiment shown, but is to be accorded the widest scope consistent with the principles and features described herein.

Figure 1:
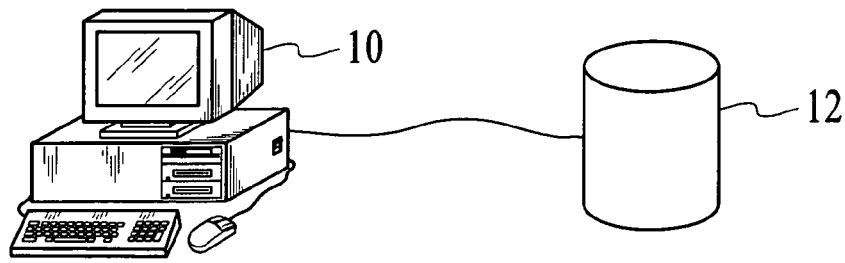
FIG. 1 illustrates a block diagram representation of a document production environment.

The aspects of the font identification through font specifications and the storage and usage of font specifications in accordance with the present invention are preferably performed in a suitable document production environment, e.g., a Macintosh production environment. FIG. 1 illustrates a basic block diagram of such an environment that includes a computer processing system 10, such as a Macintosh-type computer, operating in conjunction with a storage device 12, e.g., any suitable storage device for storing a database, such as a hard disk storage device. While a single computer system 10 has been illustrated in FIG. 1, this is done for illustrative purposes, and it is typical that multiple users and systems may interact with the data stored in the storage device 12 during the production of a document, as is well appreciated by those skilled in the art. In accordance with the present invention, the environment of FIG. 1 performs the aspects as described hereinbelow through appropriate programming stored on a computer readable medium.

Figure 2:
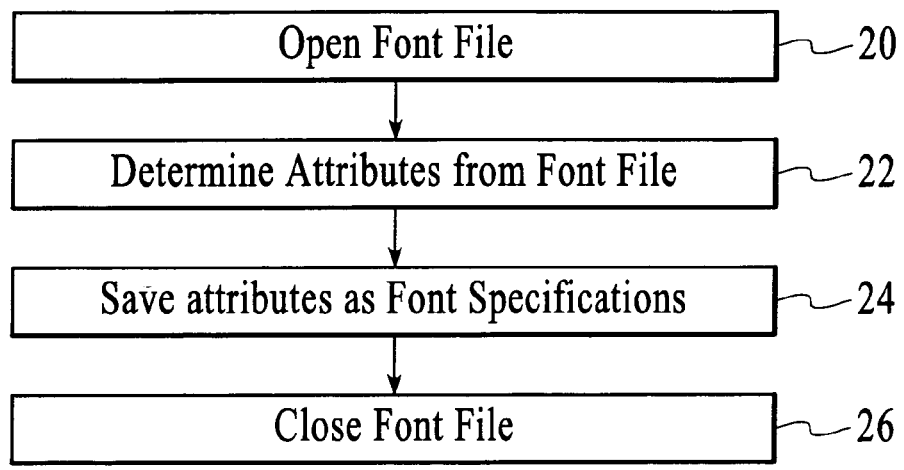
FIG. 2 illustrates a block flow diagram of a method for identifying fonts in documents in accordance with the present invention.

In accordance with the present invention, font specifications are created to uniquely identify each font used in a document by calculating a plurality of attributes for a font and saving these attributes as a font specification, as described with reference to an overall block diagram of FIG. 2. For each font used in the creation of a document, a font file is opened to initiate the font identification (step 20). It should be appreciated that the reference to a font file includes memory resident and network-based (on the Internet) fonts. The font attributes are then determined by reading, deriving, or calculating the necessary data within the font file (step 22), as described in more detail hereinbelow with reference to FIG. 3. The determined font attributes form the font specifications that uniquely identify the font used in the document. These font specifications are saved in a database of font specifications to link the font specifications with a specific font file (step 24). It should be appreciated that the term "database" includes an Internet-based distributed database with varying types of clients. The font file is then closed (step 26).

For purposes of this disclosure, font specifications refer to a set of value: data pairs corresponding to the font attributes for a particular font, including include PostScript name, foundry, version, kind, glyph data, horizontal metrics, vertical metrics, encoding, and kerning. Each unique font identification is formed from a single font specification of the value:data pairs. The following provides the description of the value:data pairs for each of the attributes.

PostScript Name: a font's name as defined by the font. This is an ASCII string, generally less than 40 bytes.

Foundry: the name of the font's foundry, as defined by the font. Some fonts include foundry name, while others have unique signatures which can be used to determine the foundry, as is well understood by those skilled in the art.

Version: the version of the font, as defined by the font. Generally an ASCII string of less than 32 characters.

Kind: the font's format and required technology. An example of technology is PostScript or TrueType. An example of format is Type 1 or Type 3 or Multiple Master (for PostScript fonts). The following are examples of possible data for the kind attribute: PostScript Type 1, PostScript Type 3, PostScript Multiple Master, TrueType, PostScript Type 1 Outline, PostScript Type 3 Outline, bitmap, OpenType PostScript, OpenType TrueType.

Glyph data: a checksum value representing the font's glyphs. Glyphs are the images stored within a font.

Horizontal metrics: a value representing a checksum of the horizontal metrics data.

Vertical metrics: a value representing a checksum of the vertical metrics data.

Encoding: a value representing a checksum of the encoding vector data.

Kerning: a value representing a checksum of the kerning data.

Figure 3:
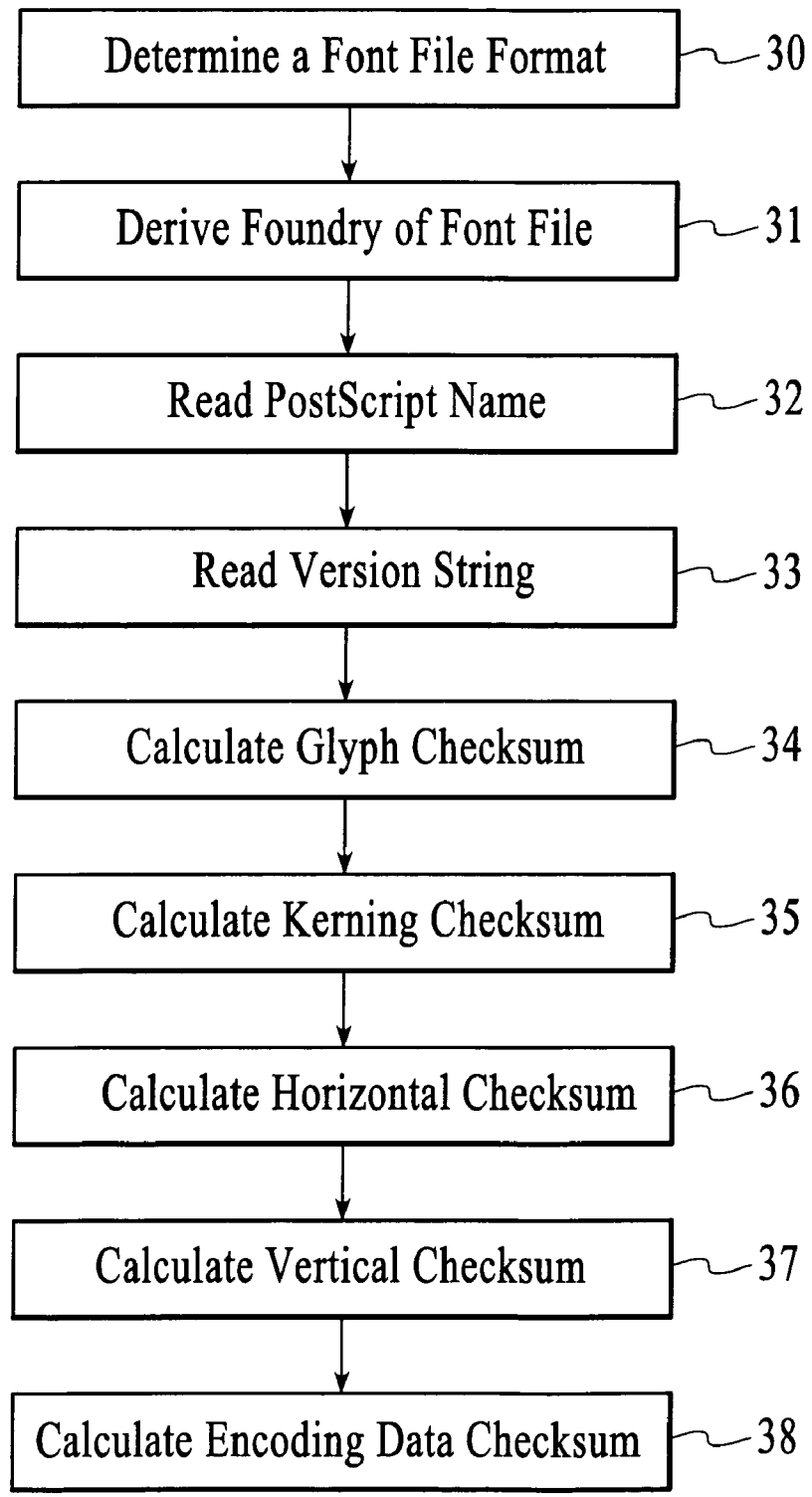
FIG. 3 illustrates a block flow diagram for determining attributes from a font file for each font in accordance with the present invention.

Determination of these attributes (step 22, FIG. 2) occurs as represented by the block flow diagram of FIG. 3. As shown, the process includes determining the format of the font file (e.g. PostScript, TrueType, etc.) (step 30). The foundry of the font file is then derived by checking a number of different attributes of the font file (step 31). For example, on a Macintosh, a first check of the "Creator" value of the font file is made and used to identify the foundry of the font. If this value is not available or does not produce a unique or identifiable foundry, the foundry is derived by using the copyright information stored with the font, as is well understood by those skilled in the art. Next, the PostScript name of the font is read from the appropriate table in the font file (step 32). The version string of the font is also read from the appropriate table in the font file (step 33). A plurality of checksum values are then calculated, including the glyph data checksum from the glyph data in the font file (step 34), the kerning data checksum from the kerning data in the font file (step 35), the horizontal metric data checksum from the horizontal metric data in the font file (step 36), the vertical metric data checksum from the vertical metric data in the font file (step 37), and the encoding data checksum from the encoding data in the font file (step 38).

The checksums are used in the font specifications as a means to identify a font characteristic which affects a font's behavior (glyphs, horizontal and vertical metrics, kerning, encoding.) The use of the checksums provides efficiency, reliability, and safety, since the checksums are very compact representations of a large set of data and can be calculated quickly, the values generated are very likely to be unique for different sets of data, even if that data is very similar, and there is no way to recover any useful portion of the original data, thus avoiding liability over license issues. While there are many different checksum algorithms, each with their own strengths, the following algorithm is suitable for the present invention.

Initialization
1. set checksum to 0.
2. get first 32-bit chunk of data from source.

Loop
1. add next 32-bit chunk of data to checksum value.
2. rotate checksum value to the left by 1 bit. For example, a value of 3 in binary is 0011; rotated to the left by 1 bit is 0100, or 4 in decimal. A binary value of 1000 0000 0000 0000 0000 0000 0000 0001; or 2147483649 in decimal, becomes 0000 0000 0000 0000 0000 0000 0000 0011, or 3 in decimal after rotating.

Figure 4:
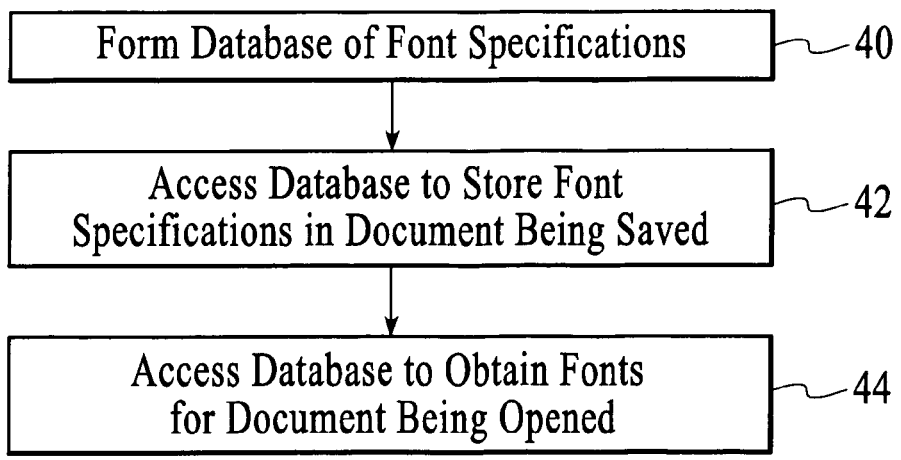
FIGS. 4, 5, and 6 illustrate block flow diagrams for the storage and usage of font specifications in accordance with the present invention.

In addition to the creation of the font specifications to uniquely identify fonts in a document, the storage and usage of the font specifications in order to avoid font mismatching in accordance with the present invention are described in further detail with reference to FIGS. 4, 5, and 6. The saving of the font specifications created for a document (step 24, FIG. 2) results in the formation of a database (step 40, FIG. 4). Usage of the font specifications occurs from access of the database in order to store font specification references in documents (step 42) and to retrieve a font from font specifications present in a document (step 44), as described in more detail with reference to FIGS. 5 and 6.

Figure 5:
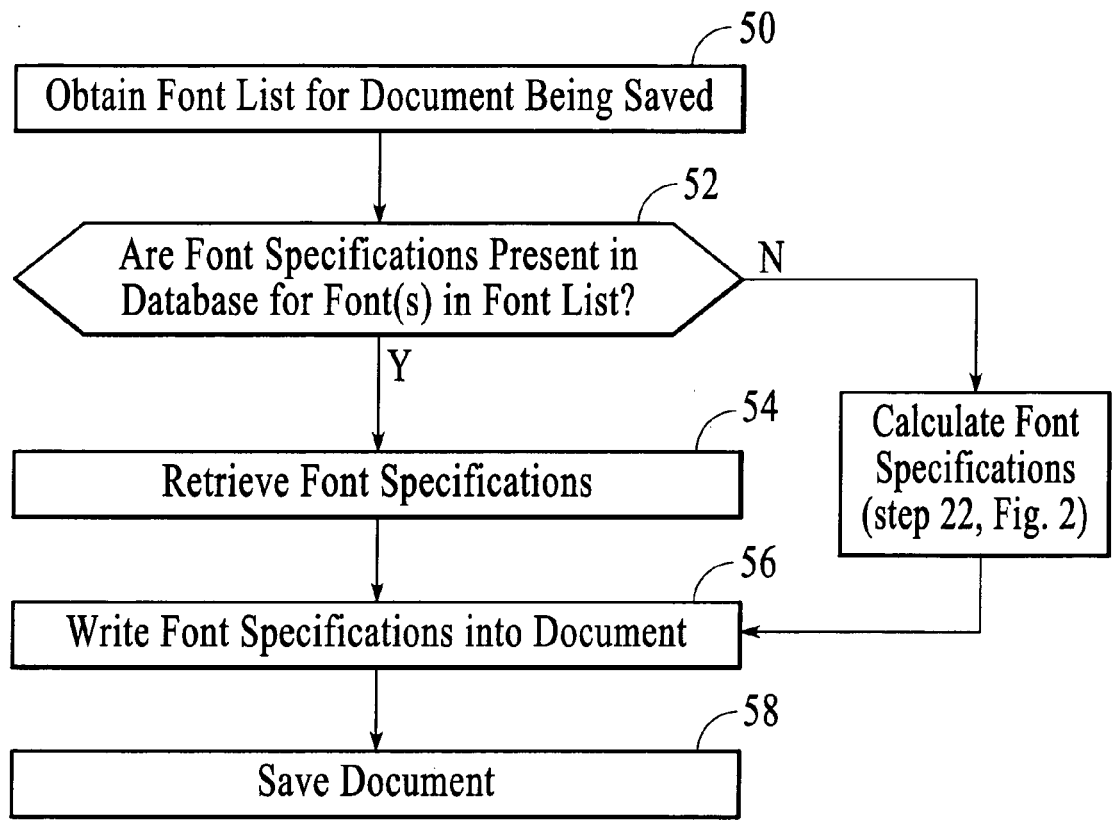
Figure 6:
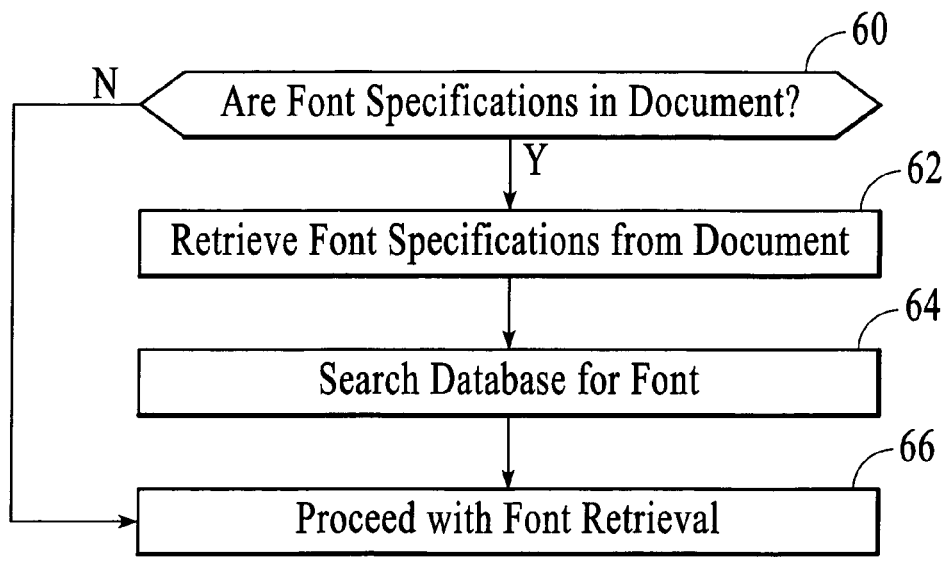

Referring now to FIG. 5, when an application saves a document, a list of the fonts used within that document is obtained (step 50, FIG. 5), for example, by a font architecture or in another example by reading the font name within a native graphic file format. If the font specifications for these fonts have already been calculated and saved in the database (as determined via step 52), the font specifications are retrieved for the fonts from the database (step 54). If the font specifications for these fonts have not already been calculated and saved in the database, the font specifications for the fonts are calculated (i.e., as described with reference to FIG. 2). Once the font specifications are retrieved or calculated, these font specifications are written into the document (step 56) and the document is saved (step 58). The location and form of the font specifications within a particular document are specific to the application saving the document but generally are similar in that they provide a list of value: data pairs, each pair representing an identifying attribute.

In addition to the use of the font specifications and database when saving a document, the database is also accessed when opening a document. Referring to FIG. 6, when an application opens a document, the document is checked for font specifications (step 60, FIG. 6). If the document does contain font specifications, then these font specifications are retrieved from the document at the time of opening the document (step 62). The font specifications are utilized to search and locate the associated fonts from the font specification database (step 64). Once located in the database, the associated fonts are retrieved (step 66) according to normal font retrieval techniques for the application opening the document.

As presented herein, the present invention effectively provides creation of font specifications that uniquely identify fonts used in a document. The present invention further provides efficient storage of the font specifications for unique association with each font in a database. In this manner, use of the proper and desired font within a document is assured.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for ensuring accurate font matching in exchanged documents, the method comprising:
   forming a database of font specifications, each of the font specifications including at least two attributes of a font and a unique identifier, the unique identifier including a set of values corresponding to the font attributes for a particular font, the font specifications are embedded in the documents during the saving of the documents; and
   accessing the database by a viewer when saving and opening documents to ensure usage of proper fonts, the viewer using the appropriate unique identifier and the font specification to look up in the database for accurate font matching.

2. The method of claim 1 wherein accessing the database when storing further comprises obtaining a font list for a document being saved, and determining whether font specifications for each font in the font list exist in the database.

3. The method of claim 2 wherein when the font specifications do exist, the method further comprises retrieving the font specifications for each font from the database.

4. The method of claim 3 wherein when the font specifications do not exist, the method further comprises creating the font specifications for each font.

5. The method of claim 4 further comprising writing the font specifications into the document, and saving the document.

6. The method of claim 1 wherein accessing the database when opening documents further comprises retrieving font specifications from a document being opened.

7. The method of claim 6 further comprising searching the database to locate each font specified by the font specifications in the document.

8. The method of claim 7 further comprising retrieving each font located.

9. A system for ensuring accurate font matching in exchanged documents, the system comprising:
   a database storage means; and
   a computer processing means operating in conjunction with the database storage means, the computer processing means for forming a database of font specifications in the database storage means, each of the font specifications including at least two attributes of a font and a unique identifier, the unique identifier including a set of values corresponding to the font attributes for a particular font, font specifications are embedded in the documents during the saving of the documents, and for accessing the database by a viewer when saving and opening documents to ensure usage of proper fonts, the viewer using the appropriate unique identifier and the font specification to look up in the database for accurate font matching.

10. The system of claim 9 wherein the computer processing means further obtains a font list for a document being saved, and determines whether font specifications for each font in the font list exist in the database.

11. The system of claim 10 wherein when the font specifications do exist, the computer processing means further retrieves the font specifications for each font from the database.

12. The system of claim 11 wherein when the font specifications do not exist, the computer processing means further creates the font specifications for each font.

13. The system of claim 12 wherein the computer processing means further writes the font specifications into the document, and saves the document.

14. The system of claim 9 wherein the computer processing means further retrieves font specifications from a document being opened, searches the database to locate each font specified by the font specifications in the document, and retrieves each font located.

15. A computer readable medium containing program instructions for ensuring accurate font matching in a document, the program instructions comprising:
   forming a database of font specifications, each of the font specifications including at least two attributes of a font, and a unique identifier, the unique identifier including a set of values corresponding to the font attributes for a particular font, the font specifications are embedded in the documents during the saving of the documents; and
   accessing the database by a viewer when saving and opening documents to ensure usage of proper fonts, the viewer using the appropriate unique identifier and the font specification to look up in the database for accurate font matching.

16. The program instructions of claim 15 wherein accessing the database when storing further comprises obtaining a font list for a document being saved, and determining whether font specifications for each font in the font list exist in the database.

17. The program instructions of claim 16 wherein when the font specifications do exist, the method further comprises retrieving the font specifications for each font from the database.

18. The program instructions of claim 17 wherein when the font specifications do not exist, the method further comprises creating the font specifications for each font.

19. The program instructions of claim 18 further comprising writing the font specifications into the document, and saving the document.

20. The program instructions of claim 15 wherein accessing the database when opening documents further comprises retrieving font specifications from a document being opened, searching the database to locate each font specified by the font specifications in the document, and retrieving each font located.

* * * * *